United States Patent
Coudurier et al.

(10) Patent No.: US 10,194,210 B2
(45) Date of Patent: Jan. 29, 2019

(54) DYNAMIC CONTENT DELIVERY NETWORK ALLOCATION SYSTEM

(71) Applicant: HULU, LLC, Santa Monica, CA (US)

(72) Inventors: Baptiste Coudurier, Los Angeles, CA (US); Sherin Kurian, Santa Monica, CA (US)

(73) Assignee: HULU, LLC, Santa Monica, CA (US)

( * ) Notice: Subject to any disclaimer, the term of this patent is extended or adjusted under 35 U.S.C. 154(b) by 785 days.

(21) Appl. No.: 14/618,582

(22) Filed: Feb. 10, 2015

(65) Prior Publication Data

US 2016/0234069 A1    Aug. 11, 2016

(51) Int. Cl.
| | |
|---|---|
| *G06F 15/173* | (2006.01) |
| *H04N 21/647* | (2011.01) |
| *H04L 12/24* | (2006.01) |
| *H04L 29/06* | (2006.01) |
| *H04L 29/08* | (2006.01) |

(52) U.S. Cl.
CPC ... *H04N 21/64738* (2013.01); *H04L 41/5025* (2013.01); *H04L 65/4084* (2013.01); *H04L 65/80* (2013.01); *H04L 67/02* (2013.01); *H04N 21/64753* (2013.01); *H04L 41/509* (2013.01)

(58) Field of Classification Search
CPC .......... H04W 72/042; H04W 72/0413; H04W 72/0446; H04W 88/08; H04W 72/0453; H04L 5/0053; H04L 5/0048; H04L 5/006; H04L 5/0044; H04L 5/0057; H04L 5/001; H04L 5/005; H04L 5/0073; H04L 1/0026
See application file for complete search history.

(56) References Cited

U.S. PATENT DOCUMENTS

| | | | |
|---|---|---|---|
| 6,205,477 B1 * | 3/2001 | Johnson ............ | H04L 29/12066 709/203 |
| 8,117,306 B1 | 2/2012 | Baumback et al. | |
| 2005/0033858 A1 | 2/2005 | Swildens et al. | |
| 2008/0215718 A1 | 9/2008 | Stolorz et al. | |

(Continued)

FOREIGN PATENT DOCUMENTS

KR    10-2010-0054661 A    5/2010

OTHER PUBLICATIONS

International Search Report & Written Opinion for PCT Application PCT/US2016/017380 dated Jun. 8, 2016, 16 pages.

(Continued)

*Primary Examiner* — Arvin Eskandarnia
*Assistant Examiner* — Thao D Duong
(74) *Attorney, Agent, or Firm* — Fountainhead Law Group P.C.

(57) ABSTRACT

Particular embodiments allow a content delivery service to dynamically adjust how the service allocates content delivery traffic to multiple content delivery networks (CDNs). In one embodiment, the content delivery service may service enough requests for media programs that multiple CDNs are used. This allows the content delivery service to allocate traffic to different CDNs. Instead of solely relying on the CDN to provide quality of service solutions, the content delivery service may configure client devices to send information to it that allows the content delivery service to analyze the media program playback quality of service. Then, the content delivery service can adjust the allocation for the CDNs if a problem is detected at a specific CDN.

19 Claims, 7 Drawing Sheets

(56) References Cited

U.S. PATENT DOCUMENTS

| | | | |
|---|---|---|---|
| 2010/0036954 A1* | 2/2010 | Sakata | H04L 12/6418 709/226 |
| 2010/0228819 A1* | 9/2010 | Wei | G06F 9/505 709/203 |
| 2011/0019627 A1* | 1/2011 | Krishnaswamy | H04L 12/14 370/329 |
| 2011/0078327 A1* | 3/2011 | Li | H04L 29/12066 709/238 |
| 2013/0013377 A1* | 1/2013 | Kruglick | G06Q 30/04 705/7.36 |
| 2013/0013688 A1 | 1/2013 | Wang et al. | |
| 2013/0268577 A1 | 10/2013 | Oyman | |
| 2014/0108671 A1 | 4/2014 | Watson et al. | |
| 2014/0181285 A1* | 6/2014 | Stevens | H04L 67/322 709/223 |
| 2015/0012593 A1* | 1/2015 | Phillips | H04L 67/2847 709/204 |
| 2015/0382057 A1* | 12/2015 | Huang | H04N 21/2543 725/14 |

OTHER PUBLICATIONS

Extended European Search Report & Opinion for EP Application 16749817.9 dated Jul. 20, 2018, 9 pages.

* cited by examiner

| Platform type | CDN #1 | CDN #2 | CDN #n | 304 |
|---|---|---|---|---|
| Phone type #1 | Metrics #1A | Metrics #2A | Metrics #nA | |
| Console type #1 | Metrics #1B | Metrics #2B | Metrics #nB | |
| Website | Metrics #1C | Metrics #2C | Metrics #nC | |

DYNAMIC CONTENT DELIVERY NETWORK ALLOCATION SYSTEM

BACKGROUND

A content delivery service may use an independent content delivery network (CDN) to deliver videos to clients. CDNs typically include large networks that can deliver a large amount of video traffic to clients. For example, the content delivery service receives requests from users for videos. The content delivery service then uses a single CDN to service all the requests for videos from clients.

CDNs specialize in sending videos to clients. For example, CDNs typically have a distributed system of servers that are deployed in multiple data centers that can deliver videos to clients. If some problems occur with delivering videos, the CDN can adjust the servers that are used to send the videos to different servers in the same data center, or from one data center to another data center. This provides some assurance that video delivery quality is adequate. However, the CDN is the entity that analyzes whether video delivery problems occur. In some cases, the CDN may be slow to realize that performance has degraded. Also, the CDNs may not be able to recognize when certain problems may have occurred. This may degrade the video delivery quality that users of the content delivery service are experiencing. Further, the content delivery service may not realize that problems are occurring until users complain to the service. At this time, many users may have already experienced poor quality. Also, after receiving notice, it may take the content delivery service a couple hours to reconfigure the service to use another CDN.

DETAILED DESCRIPTION

Described herein are techniques for a dynamic content delivery allocation system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments allow a content delivery service to dynamically adjust how the service allocates content delivery traffic to multiple content delivery networks (CDNs). In one embodiment, the content delivery service may service enough requests for media programs that multiple CDNs are used. For example, the content delivery service may contract with multiple independent CDNs to have media programs delivered to users. This allows the content delivery service to allocate traffic to different CDNs.

Instead of solely relying on the CDN to provide quality of service solutions, the content delivery service may configure client devices to send information to it that allows the content delivery service to analyze the media program playback quality of service. Then, the content delivery service can adjust the allocation for the CDNs if a problem is detected at a specific CDN. For example, the content delivery service may analyze the quality of service metrics for each CDN and also the cost of sending traffic through the CDN. Then, based on the analysis, the content delivery service may adjust the percentages of media traffic allocated to CDNs. For example, the content delivery service may lower the percentage of media program traffic being allotted to a first CDN and increase the percentage of media program traffic being allotted to a second CDN if the first CDN is having problems with poor quality of service, and the second CDN has a lower cost than other CDNs.

Conventionally, most content delivery services may only use a single CDN. However, in particular embodiments, the content delivery service services a large number of media program requests and needs to use multiple CDNs to handle the traffic. This allows the content delivery service to choose how much traffic each CDN handles for the content delivery service. To make this determination, particular embodiments configure client devices to send information directly to the content delivery service, and not through the CDN, to allow the content delivery service to analyze the quality of service being experienced at the client devices. This allows the content delivery service to independently change the allocation of traffic allotted to CDNs.

Figure 1:
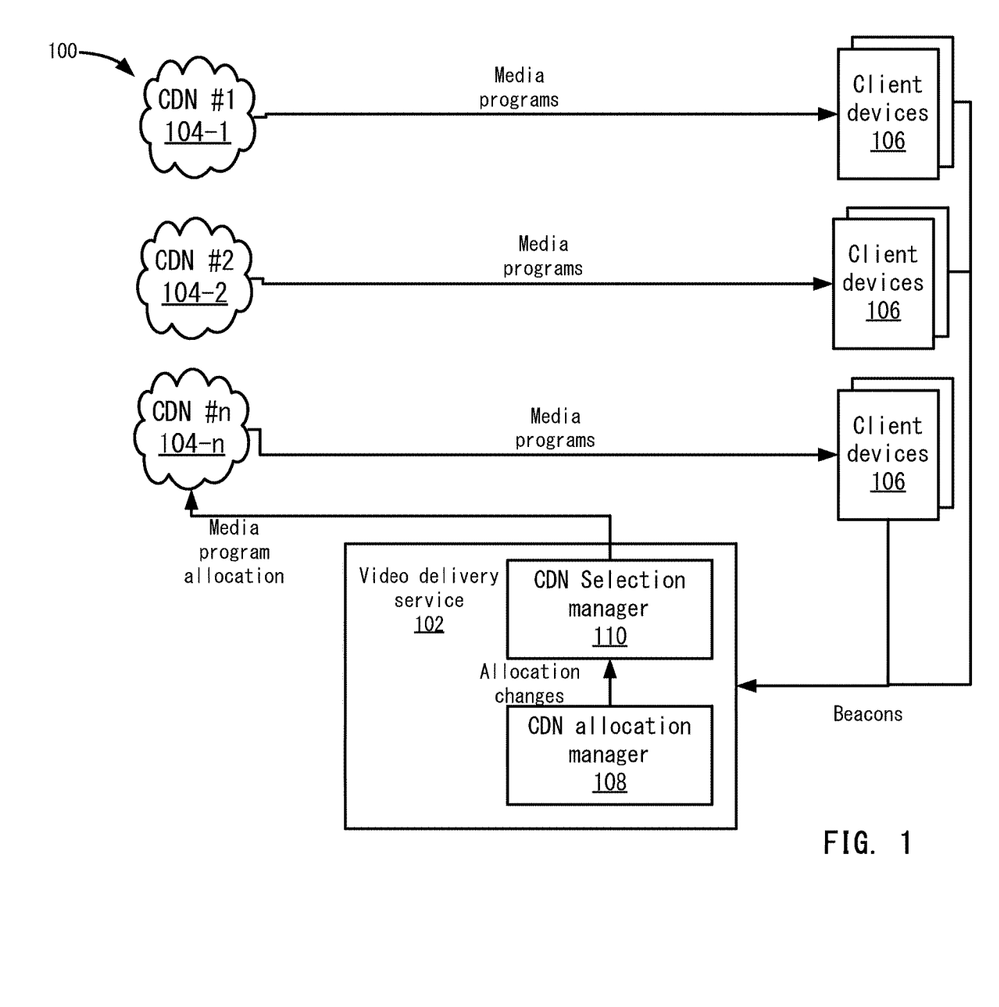
FIG. 1 depicts a simplified system of a method for dynamically adjusting allocation of traffic to CDNs according to one embodiment.

FIG. 1 depicts a simplified system 100 of a method for dynamically adjusting allocation of traffic to CDNs according to one embodiment. System 100 includes a content delivery service 102, multiple content delivery networks (#1, #2, . . . , #n) 104-1-104-n, and client devices 106.

Content delivery service 102 may be a company that provides a service where users of client devices 106 can request media programs. In one embodiment, service 102 may include a number of computing devices that respond to requests from client devices 102 and allocate the requests to CDNs 104. The media programs may be videos, audio, or other content that can be delivered by CDNs 104 to client devices 106. In one embodiment, the delivery service involves videos only. Content delivery service 102 may include a library of media programs that users can select via a content delivery service application provided by the content delivery service. When a media program is selected, content delivery service 102 selects which one of CDNs 104 should provide the media program to the requesting client device 106.

Clients 106 may be different types of devices. For example, clients 106 may be provided on different platforms, which categorize use in similar categories. For example, platforms may be by device type or location use type. Device type may be a phone type (e.g., cellular phone operating system), console system type, website, etc. The location use type may be a website platform, a living room device platform (e.g., gaming consoles, video streaming devices, etc.), and a mobile device platform (e.g., cellular telephones or smartphones, tablet devices). Different ways of categorizing use may be appreciated. Each client 106 may include a content delivery service application, which may be a website or application downloaded to client 106. The content delivery service application may include a media player that can play media programs.

CDNs 104 may be content delivery networks that contract out their networks to multiple companies. Each CDN 104 may include a network that includes multiple servers and data centers that are capable of delivering media programs to client devices 106. CDNs 104 may contract with content delivery service 102 separately because the CDN and content delivery service are independent entities. Also, each CDN is a separate entity and not related in one embodiment. In other embodiments, each CDN 104 may be an independent distribution network, but more than one may be related to the same entity.

Each CDN 104 may have a cost that is charged to content delivery service 102. For example, CDN 104-1 includes a cost #1, CDN 104-2 includes a cost #2, and CDN 104-n includes a cost #n. CDNs 104 charge content delivery service 102 for the traffic sent to client devices 106, such as per the amount of byte sent for the media programs delivered to client devices 106.

When videos are delivered to client devices 106, the content delivery service application in clients 106 receives and plays the media programs, such as in a media player. Because content delivery service 102 provides the content delivery service application, the content delivery service application can send information to content delivery service 102 regarding characteristics of the media program playback. For example, the information may be sent in a beacon, which is a message that includes the characteristics determined regarding the media program playback. The beacons sent to content delivery service 102 may not go through CDNs 104. Rather, a different service network may be used by clients 106 to send the beacons. Further, CDNs 104 may perform their own quality of service analysis, but content delivery service 102 performs a separate quality of service analysis using the beacons received from client devices 106.

Content delivery service 102 includes a CDN allocation manager 108 and a CDN selection manager 110. CDN allocation manager 108 may determine the allocation among CDNs that deliver videos for the content delivery service 102. In a simple example, CDN allocation manager 108 may determine allocations per CDN. For example, CDN 104-1 may be allocated 20% of the media program traffic; CDN 104-2 is allocated 30%; and CDN 104-n is allocated 50%. The allocations are a simple example, and as will be described below, the allocations may be divided on a more granular basis, such as per platform (e.g., living room platform, mobile device platform, website platform, etc.).

CDN allocation manager 108 analyzes the beacons received from client devices 106. The beacons may include characteristics for the media program playback sessions on client devices 106 for media programs received from CDNs 104. For example, a first client device 106 may send a beacon for a media program received from CDN 104-1, a second client device 106 may send a beacon for a media program received from CDN 104-2, and so on. The characteristics may include re-buffering time at the client, view through of a selected media program, whether beacons were sent, whether there were error messages, and the CDN used.

CDN allocation manager 108 analyzes the information from the beacons and determines when a media program delivery problem may be occurring with a CDN 104. For example, CDN allocation manager 108 may determine that media programs being sent by CDN 104-1 are experiencing high re-buffer rates. In this case, CDN allocation manager 108 may determine that CDN 104-1 should be allocated less media program traffic. For example, when requests for media programs are received from client devices 106, CDN 104-1 should be allocated a lower number of those requests. This reduces the media program traffic being delivered by CDN 104-1 for content delivery service 102

To change the allocation, CDN allocation manager 108 may then adjust the allocation for CDN 104-1 from 20% to 10% of media program traffic. Also, CDN allocation manager 108 may increase the percentage for CDN 104-2 from 30% to 40%. In this case, the problems being experienced using CDN 104-1 may be minimized because CDN 104-1 will now service fewer requests for media programs and less traffic for the content delivery service. But, CDN 104-2, which has not experienced delivery problems, now services more media program traffic. Also, CDN allocation manager 108 may take into account cost when changing the allocation. For example, CDNs in which the cost is lower may be allotted more of a percentage of re-allocated traffic. The allocation determination will be described in more detail below.

CDN selection manager 110 receives the allocation change from CDN allocation manager 108 and can then use the allocation change when servicing media program requests from client devices 106. In this case, CDN selection manager 110 may allocate less traffic to CDN 104-1 when requests from media programs are received from clients 106.

Figure 2:
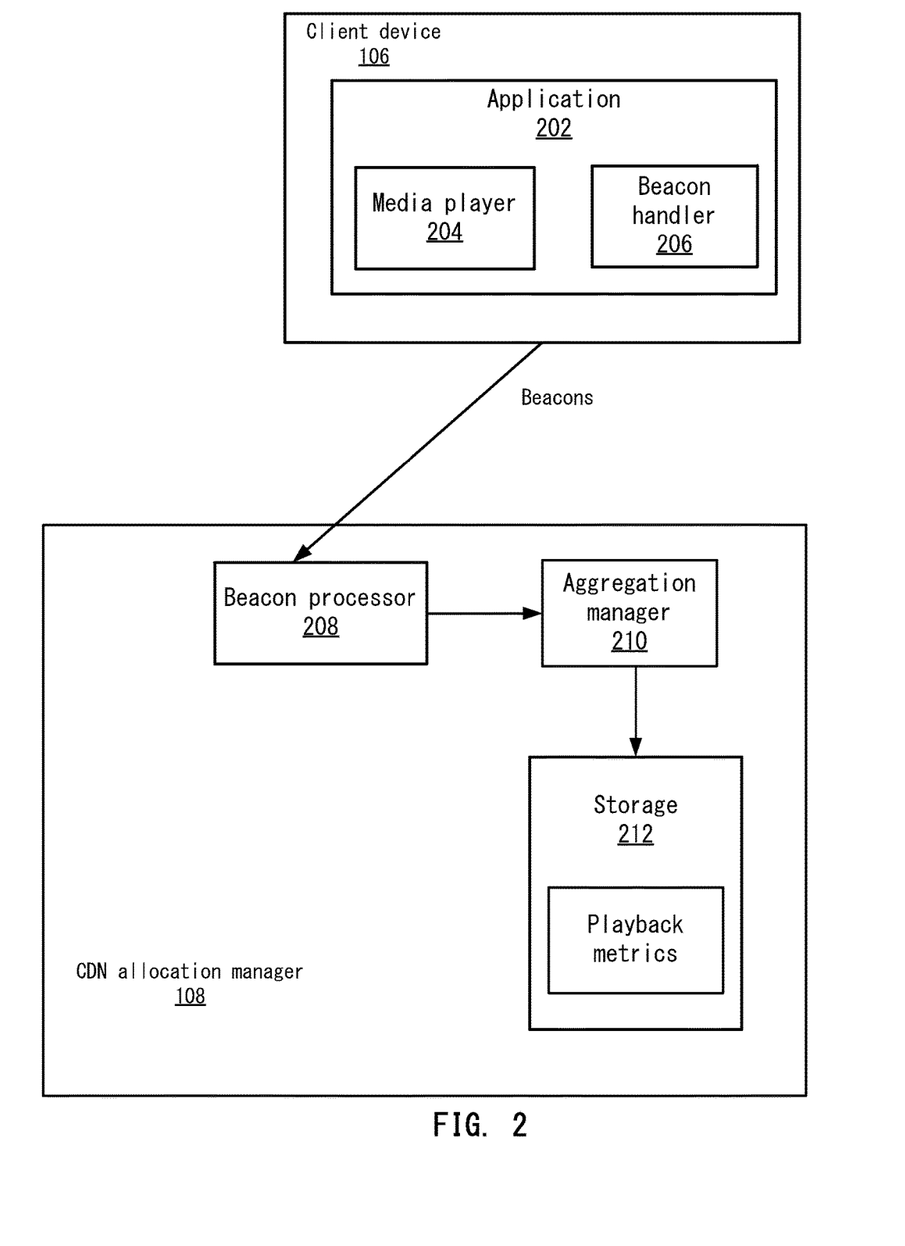
FIG. 2 depicts a more detailed example of a CDN allocation manager according to one embodiment.

FIG. 2 depicts a more detailed example of CDN allocation manager 108 according to one embodiment. Client device 106 includes a content delivery service application 202 that includes a media player 204. Content delivery service application 202 may be a website that allows a user to browse the library of media programs offered by content delivery service 102. Also, content delivery service application 202 may be a downloaded application, such as a mobile application. Media player 204 may play videos received from CDNs 104. Content delivery service application 202 and/or media player 204 includes a beacon handler 206 that can send beacons to content delivery service 102.

Beacon handler 206 may determine characteristics for media program playback on media player 204. The beacons may include information as described above, such as the CDN used for the media program playback session, the client device where the session is being played, characteristics of the re-buffering during playing of the media program, the bitrate at which the media program is being played, viewthrough statistics, etc. Beacon handler 206 may also collect other information regarding the playback. The information collected by beacon handler 206 may be specified by content delivery service 102. This allows content delivery service 102 to determine what information is relevant to the quality of service analysis. Thus, content delivery service 102 may perform a different quality of service analysis than that performed by each CDN 104.

A beacon processor 208 in CDN allocation manager 108 receives the beacons from client devices 106. Beacon processor 208 may then retrieve the information that is relevant for the quality of service analysis from the beacons.

An aggregation manager 210 may then aggregate the data for the video playback sessions in storage 212. For example, aggregation manager 210 may aggregate the data based on platform-CDN pairs. That is, for each CDN 104, per CDN data is aggregated for each platform. For example, the pairs may be CDN #1/website, CDN #1/living room device, CDN #1/mobile device, etc.

Figure 3:
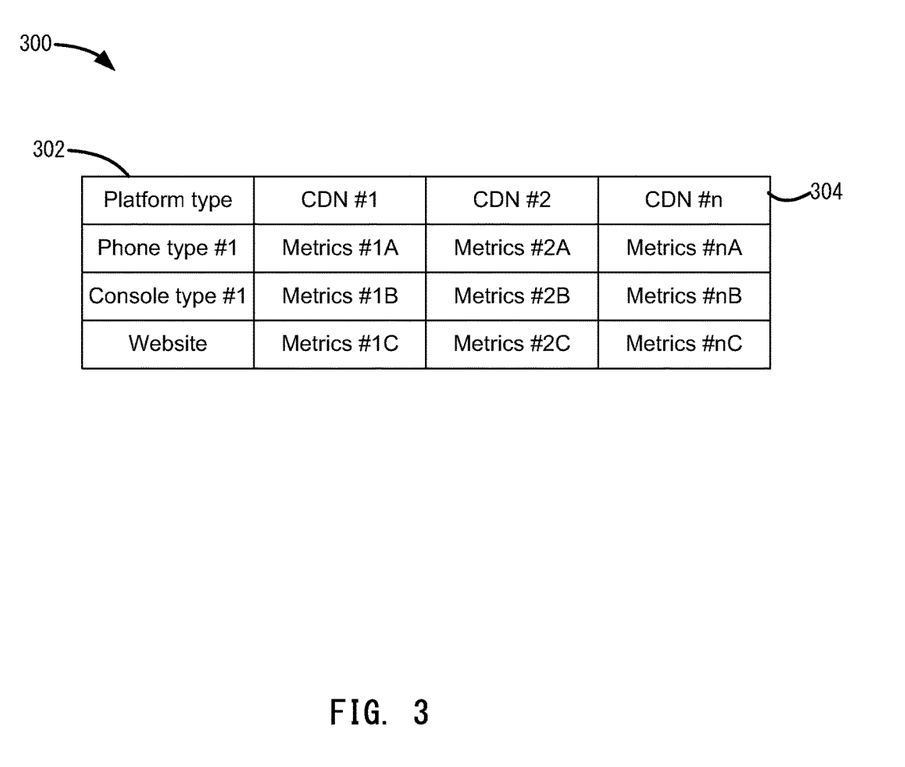
FIG. 3 shows an example of aggregated data in a table according to one embodiment.

FIG. 3 shows an example of aggregated data for playback metrics in a table 300 according to one embodiment. Table 300 is broken down into CDN-platform type pairs. In a column 302, the platform types are shown as Mobile phone type #1, Console type #1, and website. The platform types are based on different categorizations of devices on which the media delivery service may be offered. Different categories also do not need to be used. However, categories may be used to target quality of service to the categories. Also, in a row 304, CDN #1, CDN #2, and CDN #n are shown. For each pair, different metrics for the video delivery on the respective pair may be stored. For example, the metrics 1A, 1B, 1C, 2A, 2B, 2C, etc. include data that may be aggregated for each characteristic. For example, the data may be broken into segments, such as hourly session counts and buffering metrics. The session counts may be the number of views for the platform type. For example, the number of views for Mobile phone type #1 may average a certain number based on the allocated traffic. For example, a CDN when allocated a percentage of traffic should have a certain number of sessions that are active. The buffering metrics may be how many times a client device has to re-buffer a media program being played. The re-buffer may cause jitter in the playback of the media program.

Aggregation manager 210 may continuously or periodically update the metrics stored in table 300. For example, aggregation manager 210 may collect data for every platform-CDN, and at every hour update the data in table 300.

Once the aggregated data is stored in table 300, allocation manager 108 can analyze the data to determine when to change the allocation. The first part describes the calculation of thresholds to apply in the quality of service analysis. The second part then allocates traffic to CDNs 104.

Figure 4:
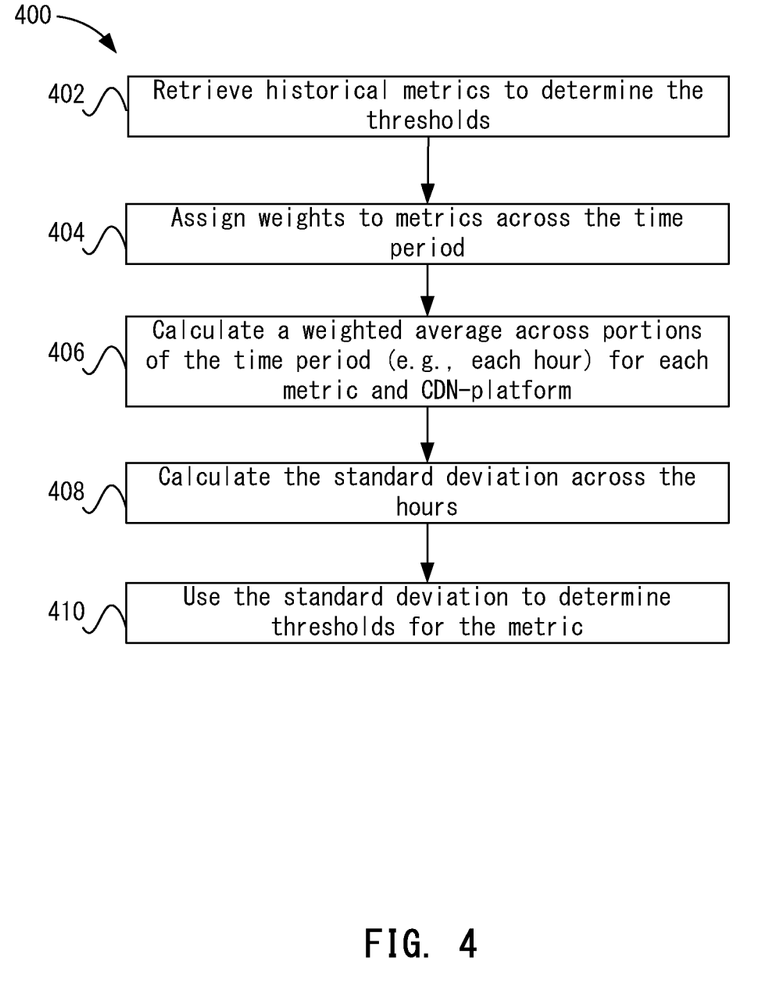
FIG. 4 depicts a simplified flowchart of a method for determining thresholds for changing allocation according to one embodiment.

FIG. 4 depicts a simplified flowchart 400 of a method for determining thresholds for changing allocation according to one embodiment. At 402, allocation manager 108 retrieves historical metrics to determine the thresholds. For example, allocation manager 108 retrieves metrics from table 300 for the platform-CDN pairs for a defined time period, such as the last six hours.

At 404, allocation manager 108 assigns weights to metrics across the time period. For example, over six hours, the most recent hour is assigned the highest weight and the latest hour is assigned the lowest weight. The weighting puts more emphasis on recent metrics, which may be more indicative of current conditions at each CDN 104. However, although weighting is described, the metrics do not need to be weighted.

At 406, allocation manager 108 calculates a weighted average across portions of the time period (e.g., each hour) for each metric and CDN-platform. For example, each metric will have an average weighted value for each hour that represents the quality of service for the hour. The weighted average may be determined as:

hour_avg+=value*weights[i], where value is the quality of service metric used and hour_avg is the weighted average for the hour.

At 408, allocation manager 108 calculates the standard deviation across the hours. For example, the weighted hourly average is used to determine the standard deviation. Other ways of quantifying the variation or dispersion from the average may also be used.

At 410, allocation manager 108 uses the standard deviation to determine thresholds for the metric. For example, allocation manager 108 determines high and low thresholds based on the standard deviation. This may allow the performance to vary a set amount from the average. Although the above method of determining thresholds may be used, other methods may also be used, such as pre-set or pre-determined thresholds that do not vary. Also, only a single threshold or more than two thresholds may be used.

Figure 5:
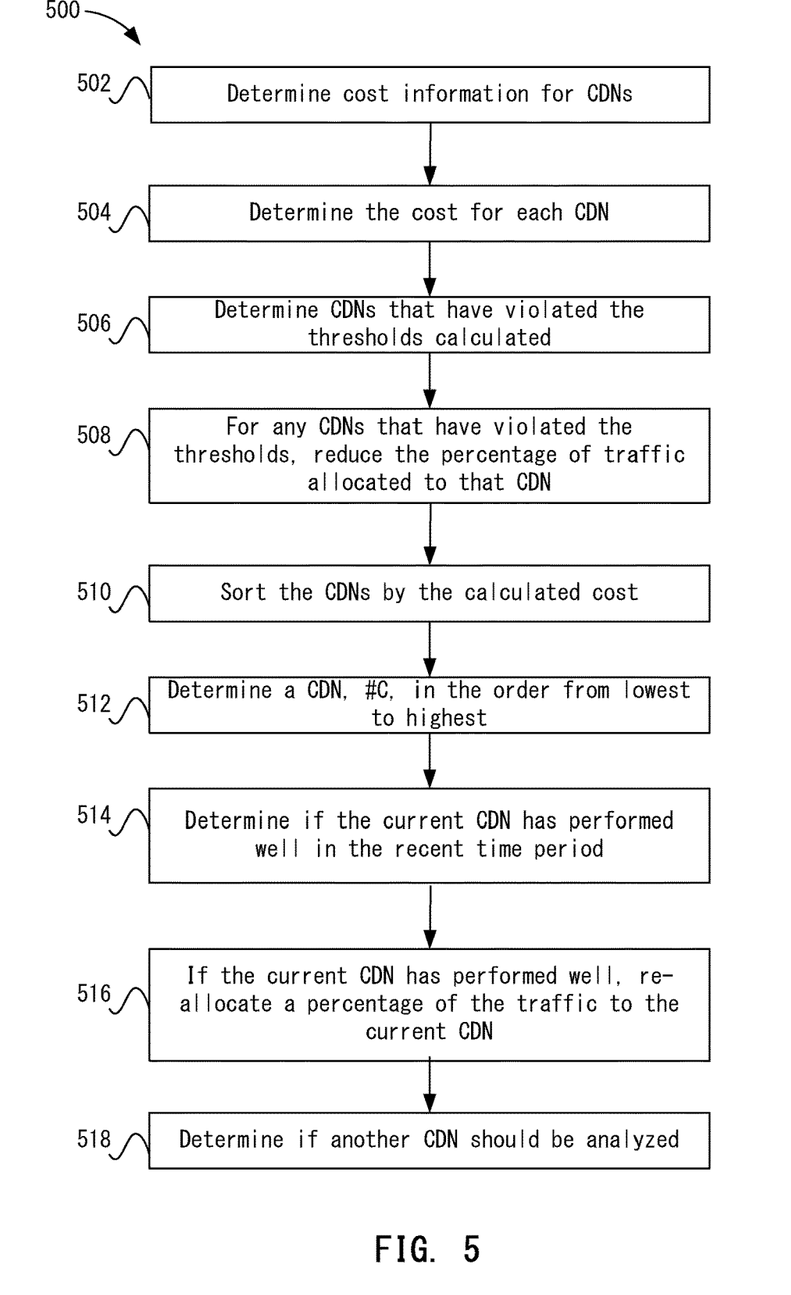
FIG. 5 depicts a simplified flowchart of a method for analyzing quality of service and performing re-allocation of traffic according to one embodiment.

Once the thresholds are determined, the quality of service can be analyzed. FIG. 5 depicts a simplified flowchart 500 of a method for analyzing quality of service and performing re-allocation of traffic according to one embodiment.

At 502, allocation manager 108 determines cost information for CDNs 104. For example, allocation manager 108 may use a fixed cost for each CDN 104 that does not change irrespective of traffic served, time of date, or other factors. Also, the cost may change for CDNs and allocation manager 108 may need to determine what cost has been recently used by each CDN. In this case, allocation manager 108 may use a CDN application programming interface (API) to retrieve information on the amount of traffic (e.g., number of bytes) served per platform over the time period (e.g., the last six hours). At 504, allocation manager 108 then determines the cost for each CDN 104. For example, if the fixed cost is being used, then allocation manager 108 does not need to perform this calculation because the cost is fixed. However, to calculate a cost that is variable, allocation manager 108 determines the cost by applying the amount of traffic for the last six hours (or another time period, if used) times the cost for delivering the traffic (e.g., bytes*cost per byte for each CDN). Each CDN may include a different cost per byte or the cost may be the same, and the cost per byte may vary. This provides a cost for each CDN over the last six hours. The cost may be represented by the total cost for six hours or a single averaged cost per byte.

The following process is then performed for each platform. At 506, allocation manager 108 determines CDNs that have violated the thresholds calculated above. For example, the metrics for each CDN may be analyzed over the time period to determine if one of the thresholds was violated. Also, current data, such as for the next hour, may be analyzed to determine when one of the thresholds was violated. At 508, for any CDNs that have violated the thresholds, allocation manager 108 reduces the percentage of traffic allocated to that CDN. For example, if CDN #1 is showing high buffering problems on the website platform, allocation manager 108 may reduce the traffic allocated to CDN #1 by a percentage, such as by half.

After reducing the traffic allotted to the platform, there is available allocation for traffic for that platform. Then, allocation manager 108 re-allocates the traffic using the cost information. At 510, allocation manager 108 sorts the CDNs by the calculated cost. For example, allocation manager 108 sorts the CDNs from the lowest cost to the highest cost. The sorting allows the analysis to proceed from the lowest cost CDNs to the highest cost CDNs. When only fixed costs are used for CDNs, allocation manager 108 uses a constant value to sort the CDNs that most likely will not change frequently. In this case, a CDN is a lowest cost will most likely be allocated more traffic in a reallocation. When costs vary, then the sorting may yield different orders of CDNs.

At 512, allocation manager 108 determines a CDN, #C, in the order from lowest to highest. At 514, allocation manager 108 determines if the current CDN has performed well in the recent time period. For example, allocation manager 108 determines if any thresholds have been violated or allocation manager 108 may determine if the weighted average for the metrics have varied much. At 516, if the current CDN has performed well, allocation manager 108 re-allocates a percentage of the traffic to the current CDN. In one embodiment, the re-allocated percentage may be limited to a certain maximum amount, such as 5%. Or, the performance of the current CDN is used to determine how much to re-allocate, such as a CDN that has not had any problems is re-allocated a higher percentage than a CDN that has had a low number of problems.

At 518, allocation manager 108 determines if another CDN should be analyzed. For example, addition traffic may need to be allocated. If so, then the process reiterates to 510 where another CDN of a higher cost is analyzed. The process continues until all traffic is re-allocated. It should be noted that all traffic is re-allocated to other CDNs by the process.

In one embodiment, allocation manager 108 may generate an alert when the quality of service problem is detected. Once the alert is generated, content delivery service 102 may perform different actions. For example, content delivery service 102 may generate an e-mail notifying engineers there was a quality drop and automatic steps of changing the allocation of traffic for a specific CDN. In one example, if CDN #1 is showing high buffering problems on the website platform, allocation manager 108 may reduce the traffic allocated to CDN #1 by a percentage, such as by half. Then, this percentage is allocated to another CDN that may be considered a lowest cost alternative, such as CDN #2. In this case, CDN #1 will now get 10% of the future traffic and CDN #2 will get 40% of the future traffic. Additionally, allocation manager 108 may also re-route the entire traffic from CDN #1 to CDN #2 if the problem persists. However, if after some time, such as a few hours, CDN #1 returns to normal, allocation manager 108 may restore the allocation for CDN #1 back to the original percentage—20%. In this case, allocation manager 108 may analyze the newly-aggregated data to determine if the buffering has gone below the threshold. Accordingly, allocation manager 108 may analyze the aggregated data to re-allocate traffic when problems result and then re-allocate traffic back to CDNs when allocation manager 108 detects that the problems have been resolved.

Accordingly, particular embodiments provide an automated and dynamic method of providing quality of service. The method relies on information from clients 106, and not the CDNs. Further, the failover process changes allocation to CDNs efficiently when problems are encountered. This improves the functioning of the allocation algorithm. Further, problems can be detected sooner and faster.

System Overview

Figure 6:
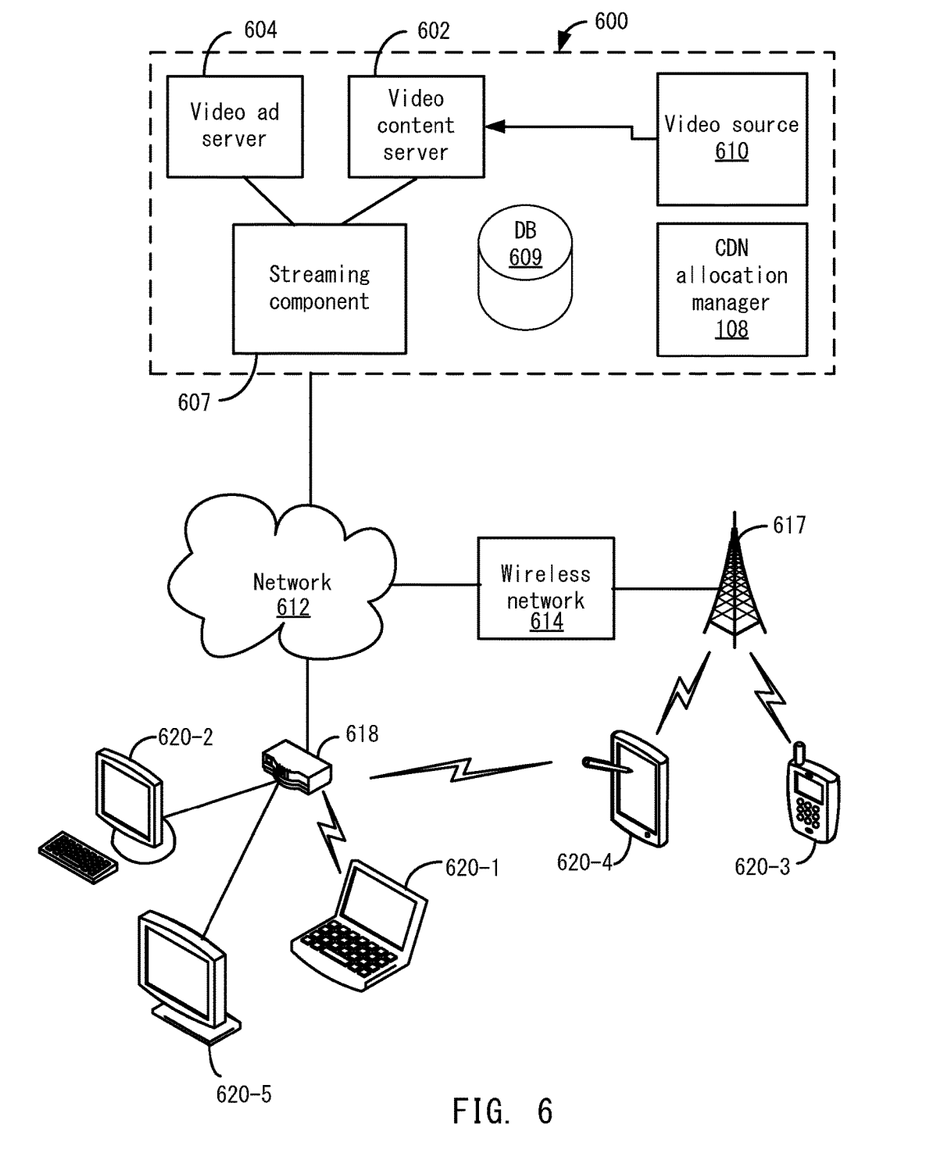
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 600, a public service message, or some other information. The video advertising server 604 may serve the video advertising segments as directed by a user interface controller (not shown).

The video streaming system 600 also may include CDN allocation manager 108.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612 and/or other network 614. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless telephony network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HTTP and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
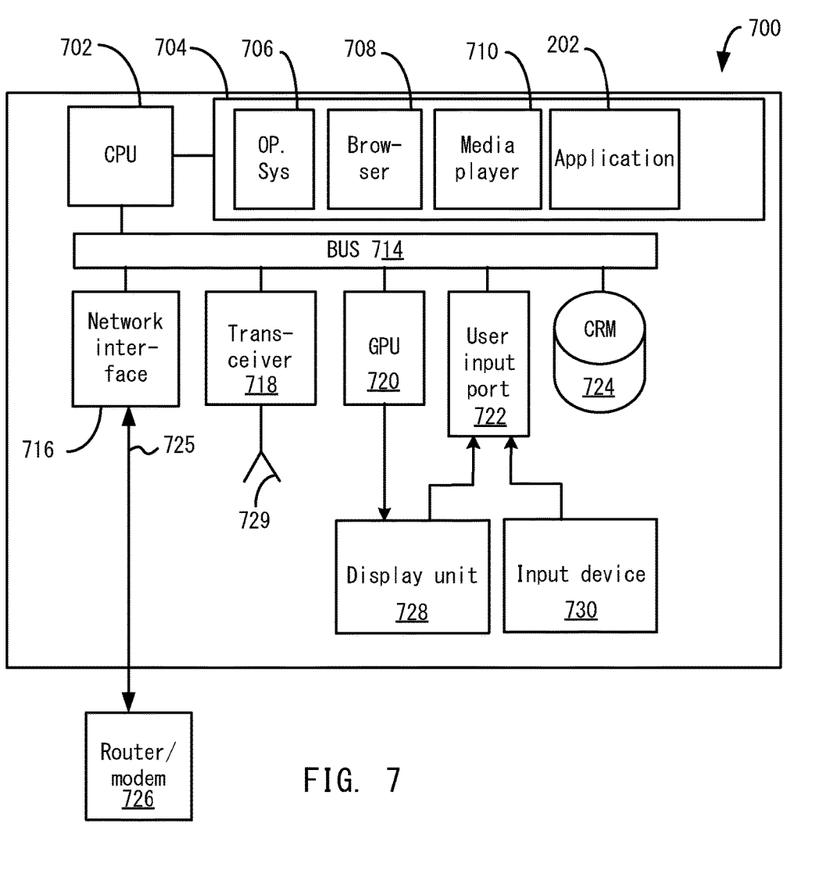
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The modules may further include content delivery service application 202. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, and 710 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing device of a content delivery service, an allocation percentage in an overall percentage for video traffic for each of a plurality of content delivery networks (CDNs), wherein each CDN is configured to select servers from each independent network for each CDN to deliver media programs for the content delivery service to client devices;
   associating, by the computing device, metrics for each CDN together based on information regarding playback of the media programs for each CDN;
   analyzing, by the computing device, the metrics for each CDN together based on information regarding the playback of the media programs for each CDN to determine when to change one or more allocation percentages in the overall percentage, wherein the metrics are associated with a time period, and wherein allocation percentages are per CDN based on a platform type, and each allocation percentage is used to allocate requests for playback of media programs to a CDN;
   reducing, by the computing device, a first allocation percentage for a platform type in the overall percentage for a first CDN in the plurality of CDNs based on the analyzing of the metrics to reduce future allocations to the first CDN, wherein the first allocation percentage is used to allocate a first set of requests for playback of media programs to the first CDN, and wherein the first CDN selects servers from a first CDN network for the first CDN to respond to the first set of requests;
   increasing, by the computing device, a second allocation percentage for a platform type in the overall percentage for a second CDN in the plurality of CDNs based on the analyzing of the metrics to increase future allocations to the second CDN, wherein the second allocation percentage is used to allocate a second set of requests for playback of media programs to the second CDN, and wherein the second CDN selects servers from a second CDN network for the second CDN to respond to the second set of requests; and
   allocating, by the computing device, requests for playback of media programs to the plurality of CDNs based on the allocation percentages in the overall percentage, wherein the reduced first allocation percentage and the increased second allocation percentage are used in allocating the requests.

2. The method of claim 1, further comprising:
   receiving messages from a plurality of client devices in which the plurality of CDNs delivered media programs, wherein the messages include information regarding the playback of the media programs on the client devices, and wherein the messages identify which CDN in the plurality of CDNs delivered the media program to the respective client device.

3. The method of claim 2, wherein the messages identify playback characteristics for an event associated with the respective media program being played.

4. The method of claim 1, wherein analyzing comprises:
   determining cost information for the plurality of CDNs; and
   using the cost information to determine the change in allocation percentages.

5. The method of claim 4, wherein determining the cost information comprises:
   determining an amount of video traffic delivered by each CDN over the time period; and
   determining the cost for each CDN based on the amount of video traffic and a traffic cost used for the CDN over the time period.

6. The method of claim 4, wherein determining the cost information comprises:
   using a fixed cost assigned for each CDN.

7. The method of claim 1, further comprising:
   aggregating information from messages from a plurality of client devices in which the plurality of CDNs delivered media programs into per-CDN metrics, wherein analyzing uses the per-CDN metrics over the time period.

8. The method of claim 1, wherein analyzing comprises:
   determining the metrics for the plurality of CDNs over the time period;
   determining a set of thresholds based on the metrics; and
   comparing the metrics for the first CDN and the second CDN against the thresholds to determine whether to change the first allocation percentage or the second allocation percentage.

9. The method of claim 8, wherein:
   the time period is divided into a plurality of segments, and
   the metrics for each segment is weighted based on a time associated with the segment.

10. The method of claim 9, wherein the set of thresholds are determined based on a weighted average for the information in each segment.

11. The method of claim 10, further comprising:
    determining the first CDN violated one of the set of thresholds; and
    lowering the first allocation percentage for the platform type for the first CDN based on the first CDN violating one of the set of thresholds.

12. The method of claim 11, further comprising:
    determining a cost for other CDNs other than the first CDN; and
    starting from a lowest cost CDN, determining when other CDNs are to have their allocation percentages increased based on the cost of the respective CDN and associated metrics for the respective CDN.

13. The method of claim 12, wherein one or more higher cost CDNs in the other CDNs have their allocation percentage increased before one or more lower cost CDNs in the other CDNs due to the lower cost CDNs having associated metrics that have violated one of the set of thresholds.

14. The method of claim 2, wherein the messages are received from the client devices and not from the plurality of CDNs.

15. The method of claim 2, wherein the content delivery service programs an application in the client devices to determine which information to include in the messages.

16. A non-transitory computer-readable storage medium containing instructions, that when executed, control a computer system to be configured for:
    determining, by a content delivery service, an allocation percentage in an overall percentage for video traffic for each of a plurality of content delivery networks (CDNs), wherein each CDN is configured to select servers from each independent network for each CDN to deliver media programs for the content delivery service to client devices;
    associating metrics for each CDN together based on information regarding playback of the media programs for each CDN;
    analyzing the metrics for each CDN together based on information regarding the playback of the media programs for each CDN to determine when to change one or more allocation percentages in the overall percentage, wherein the metrics are associated with a time period, and wherein allocation percentages are per CDN based on a platform type, and each allocation percentage is used to allocate requests for playback of media programs to a CDN;
    reducing a first allocation percentage for a platform type in the overall percentage for a first CDN in the plurality of CDNs based on the analyzing of the metrics to reduce future allocations to the first CDN, wherein the first allocation percentage is used to allocate a first set of requests for playback of media programs to the first CDN, and wherein the first CDN selects servers from a first CDN network for the first CDN to respond to the first set of requests;
    increasing a second allocation percentage for a platform type in the overall percentage for a second CDN in the plurality of CDNs based on the analyzing of the metrics to increase future allocations to the second CDN, wherein the second allocation percentage is used to allocate a second set of requests for playback of media programs to the second CDN, and wherein the second CDN selects servers from a second CDN network for the second CDN to respond to the second set of requests; and
    allocating requests for playback of media programs to the plurality of CDNs based on the allocation percentages in the overall percentage, wherein the reduced first allocation percentage and the increased second allocation percentage are used in allocating the requests.

17. The non-transitory computer-readable storage medium of claim 16, wherein analyzing comprises:
    determining cost information for the plurality of CDNs; and
    using the cost information to determine the change in allocation percentages.

18. The non-transitory computer-readable storage medium of claim 16, wherein analyzing comprises:
    determining the metrics for the plurality of CDNs over the time period;
    determining a set of thresholds based on the metrics; and
    comparing the metrics for the first CDN and the second CDN against the thresholds to determine whether to change allocation percentages.

19. An apparatus comprising:
    one or more computer processors; and
    a non-transitory computer-readable storage medium comprising instructions, that when executed, control the one or more computer processors to be configured for:
    determining, by a content delivery service, an allocation percentage in an overall percentage for video traffic for each of a plurality of content delivery networks (CDNs), wherein each CDN is configured to select servers from each independent network for each CDN to deliver media programs for the content delivery service to client devices;

associating metrics for each CDN together based on information regarding playback of the media programs for each CDN;

analyzing the metrics for each CDN together based on information regarding the playback of the media programs for each CDN to determine when to change one or more allocation percentages in the overall percentage, wherein the metrics are associated with a time period, and wherein allocation percentages are per CDN based on a platform type, and each allocation percentage is used to allocate requests for playback of media programs to a CDN;

reducing a first allocation percentage for a platform type in the overall percentage for a first CDN in the plurality of CDNs based on the analyzing of the metrics to reduce future allocations to the first CDN, wherein the first allocation percentage is used to allocate a first set of requests for playback of media programs to the first CDN, and wherein the first CDN selects servers from a first CDN network for the first CDN to respond to the first set of requests;

increasing a second allocation percentage for a platform type in the overall percentage for a second CDN in the plurality of CDNs based on the analyzing of the metrics to increase future allocations to the second CDN, wherein the second allocation percentage is used to allocate a second set of requests for playback of media programs to the second CDN, and wherein the second CDN selects servers from a second CDN network for the second CDN to respond to the second set of requests; and allocating requests for playback of media programs to the plurality of CDNs based on the allocation percentages in the overall percentage, wherein the reduced first allocation percentage and the increased second allocation percentage are used in allocating the requests.

* * * * *